(12) United States Patent
Nakao et al.

(10) Patent No.: US 8,092,633 B2
(45) Date of Patent: Jan. 10, 2012

(54) IC TAG, PNEUMATIC TIRE FITTED WITH THE SAME, AND METHOD OF FITTING IC TAG

(75) Inventors: Yukio Nakao, Kobe (JP); Wakahiro Kawai, Kyoto (JP); Masaru Kijima, Tokyo (JP)

(73) Assignees: Sumitomo Rubber Industries, Ltd., Kobe (JP); OMRON Corporation, Kyoto (JP)

( * ) Notice: Subject to any disclaimer, the term of this patent is extended or adjusted under 35 U.S.C. 154(b) by 287 days.

(21) Appl. No.: 12/517,635

(22) PCT Filed: Dec. 3, 2007

(86) PCT No.: PCT/JP2007/073306
§ 371 (c)(1),
(2), (4) Date: Jun. 4, 2009

(87) PCT Pub. No.: WO2008/069169
PCT Pub. Date: Jun. 12, 2008

(65) Prior Publication Data
US 2010/0032066 A1 Feb. 11, 2010

(30) Foreign Application Priority Data
Dec. 5, 2006 (JP) .................. 2006-328569

(51) Int. Cl.
*B32B 37/12* (2006.01)
*B32B 37/14* (2006.01)
*G08C 17/00* (2006.01)

(52) U.S. Cl. ........ 156/289; 156/292; 156/314; 340/442; 340/572.8

(58) Field of Classification Search ............... 340/572.8, 340/572.9
See application file for complete search history.

(56) References Cited

U.S. PATENT DOCUMENTS

| 5,266,611 | A * | 11/1993 | Teschendorf | ................. 523/416 |
| 2004/0094251 | A1 * | 5/2004 | Strache et al. | ............. 152/152.1 |
| 2006/0105178 | A1 * | 5/2006 | Roitman | .................... 428/423.1 |
| 2006/0123899 | A1 | 6/2006 | Nakao et al. | |
| 2006/0164250 | A1 * | 7/2006 | Kawai | ......................... 340/572.8 |
| 2006/0216452 | A1 * | 9/2006 | Tomita et al. | ................ 428/40.1 |
| 2008/0020516 | A1 | 1/2008 | Kawai et al. | |

FOREIGN PATENT DOCUMENTS

| JP | 2006-168472 A | 6/2006 |
| JP | 2006-168473 A | 6/2006 |
| WO | WO-2005/104019 A1 | 11/2005 |

* cited by examiner

*Primary Examiner* — Philip Tucker
*Assistant Examiner* — William Bell
(74) *Attorney, Agent, or Firm* — Birch, Stewart, Kolasch & Birch, LLP

(57) ABSTRACT

Deadhesion of an IC tag inlet during vulcanization molding of tire is suppressed, while preventing adhesion of a portion other than a sticking out portion. An IC tag comprises a sheet-like IC tag inlet 2, a protective cover 3 of an unvulcanized rubber sheet adhered to the surface Sf of the inlet 2 through a primer layer 10 and an adhesive layer 11, and an antiadhesive layer 4 formed on the rear surface Sr of the inlet 2, wherein a maximum value $Ga'max$ of storage shear modulus $Ga'$ of a rubber of the protective cover 3 at a temperature of 150 to 200° C. and a storage shear modulus $Gb'0$ of the primer layer 10 at a temperature T0 showing the maximum value $Ga'max$ satisfy the following equation: $Ga'max \times 10^{-2} < Gb'0$.

5 Claims, 6 Drawing Sheets

US 8,092,633 B2

IC TAG, PNEUMATIC TIRE FITTED WITH THE SAME, AND METHOD OF FITTING IC TAG

TECHNICAL FIELD

The present invention relates to an IC tag including an IC tag inlet capable of communicating by radio, which has a simple structure and can be strongly fitted to an inner surface of a tire. The invention also relates to a pneumatic tire fitted with the IC tag, and a method for fitting the IC tag.

BACKGROUND ART

In case of, for example, tires for vehicles such as automobiles, it is needed to quickly know information of individual tires, e.g., model number, manufacture's serial number, specifications, characteristics, processing history and usage history, in management of manufacture, delivery, distribution, maintenance, etc. For this purpose, recently, it is proposed to attach an electronic component for storing such information, such as an IC tag inlet, to tires.

As a means for attaching such an electronic component to tires is known, for example, one disclosed in Patent Literature 1 As shown in FIG. 6, this attaching means uses an IC tag "c" in which an electronic component "a" is interposed between two rubber sheets b1, b2 for cover and entire periphery of the two sheets b1, b2 are stuck together to hermetically seal the electronic component "a" in the rubber sheets. In this IC tag "c", only a sticking out portion b2e of the rubber sheet b2 which sticks out from an area of the electronic component "a" is adhered to the inner surface of a tire by cure adhesion. Therefore, this tag has advantages that deformation, impact and heat generation of a tire which may occur during running can be suppressed from being transmitted to the electronic component and accordingly deterioration in performances or failure of the electronic component can be effectively prevented. An area "f" other than the sticking out portion b2e is covered with an antiadhesive layer "g", e.g., a release sheet, in order to prevent cure adhesion of the area "f" to the inner surface of the tire.

Patent Literature 1: JP 2006-168472

DISCLOSURE OF THE INVENTION

Problem to be Solved by the Invention

However, since a rear surface side of the IC tag with this structure, on which the antiadhesive layer "g" is formed, is also covered with the rubber sheet b2, the rubber sheet b2 on this side may also cause rubber flow at the time of vulcanization molding of tire, and the flowing rubber may run over the antiadhesive layer "g" to come into contact with the inner surface of the tire. Therefore, a problem is easy to arise that adhesion may also occur partly at a portion other than the sticking out portion b2e of the IC tag.

Thus, the present inventors made a proposal that the rear side rubber sheet b2 is omitted from the IC tag to hold the electronic component "a" only by adhesion thereof to the front side rubber sheet b1, and the IC tag is attached to a tire by cure adhesion of a sticking out portion of the front side rubber sheet b1 to the inner surface of the tire. In this case, since the rear side rubber sheet b2 is not used, there is no rubber flow and, therefore, the IC tag is prevented from adhering to the tire inner surface at a portion other than the sticking out portion. On the other hand, however, since the electronic component is held only by adhesion to the front side rubber sheet b1, there arises a new problem to be solved that deadhesion of the electronic component "a" from the rubber sheet b1 occurs at the time of vulcanization molding owing to high shearing force acting on by a bladder.

It is an object of the present invention to provide an IC tag capable of suppressing deadhesion of an electronic component during vulcanization molding of tire, while preventing a portion other than the sticking out portion from adhering to the inner surface of tire, and to provide a pneumatic tire attached with the IC tag and a method for attaching an IC tag.

Means to Solve the Invention

In order to achieve the object mentioned above, the invention of the present application is characterized in that it includes a sheet-like IC tag inlet mounted with an IC chip and an antenna, a protective cover which is made of an unvulcanized rubber sheet adhered to the front surface of the IC tag inlet through a primer layer and an adhesive layer and which has a sticking out protion which runs out from a part of the periphery of the IC tag inlet, and an antiadhesive layer formed on the rear surface of the IC tag inlet for preventing cure adhesion between the rear surface and a rubber, and that the primer layer satisfies the following equation (1):

$$Ga'\mathrm{max} \times 10^{-2} < Gb'0 \qquad (1)$$

wherein Ga'max is a maximum value of storage shear modulus Ga' of a rubber of the protective cover within the temperature range of 150 to 200° C., and Gb'0 is a storage shear modulus of the primer layer at a temperature T0 exhibiting the maximum value Ga'max.

The invention is characterized in that the IC tag inlet and the protective cover are in a rectangular form that the periphery is surrounded by four sides, the protective cover has, on a side of one of the four sides, the sticking out portion which runs out from one side of the IC tag inlet by a distance K of at least 1.0 mm, and each of the remaining three sides of the protective cover is located inward of each of the remaining three sides of the IC tag inlet by a distance L of at least 0.5 mm.

The invention is directed to a pneumatic tire having the IC tag fitted to the tire inner surface, in which the sticking out portion of the protective cover is adhered to the tire inner surface.

The invention is directed to a method for fitting the IC tag to an inner surface of a pneumatic tire, in which the sticking out portion of the protective cover is adhered by tacky adhesion to an inner surface of an unvulcanized green tire to temporarily attach the IC tag, and the green tire is subjected to vulcanization molding in a mold to perform vulcanization adhesion of only the sticking out portion of the protective cover to the tire inner surface by vulcanization heat and vulcanization pressure.

The term "storage shear modulus" means a value measured with a viscoelasticity spectrometer under the conditions of initial strain 10%, amplitude 2.0% and frequency 10 Hz according to JIS K 6394 "Testing methods of dynamic properties for rubber, vulcanized or thermoplastic".

Effects of the Invention

In the present invention, as mentioned above, an electronic component, i.e., an IC tag inlet in the form of a sheet, is held by adhesion to a sheet of a protective cover composed of a rubber sheet, and an antiadhesive layer is directly formed on the rear surface side of the IC tag inlet without any intervening rubber sheet. Therefore, when conducting vulcanization adhesion of an IC tag to the tire inner surface by adhering the sticking out portion of the protective cover, no rubber flow occurs since no rubber sheet is present on the rear surface side of the inlet and, therefore, the IC tag is prevented from adhering at portions other than the sticking out portion.

Further, the IC tag inlet is adhered to the protective cover through a primer layer and an adhesive layer. The primer layer is regulated to satisfy the following equation (1):

$$Ga'\mathrm{max} \times 10^{-2} < Gb'0 \tag{1}$$

wherein Ga'max is a maximum value of storage shear modulus Ga' of a rubber of the protective cover at a temperature range of 150 to 200° C., and Gb'0 is a storage shear modulus of the primer layer at a temperature T0 exhibiting the maximum value Ga'max.

At the time of vulcanization molding of a tire, a vulcanization pressure is imparted to the tire inner surface by expansion of a bladder. During the expansion process, a strong shear force along the tire inner surface generates and acts also on the protective cover of the IC tag.

On the other hand, the rubber of the protective cover starts its vulcanization at a temperature of about 150° C., and the value of storage shear modulus Ga' increases with elevation of the temperature. To the contrary, the storage shear modulus Gb' of the primer layer decreases. Therefore, if the difference between the storage shear modulus Ga' and the storage shear modulus Gb' becomes large in the course of the vulcanization, the primer layer cannot endure the shear force received from the rubber of the protective layer the elasticity of which has increased, thus resulting in occurrence of deadhesion of the IC tag.

Therefore, the deadhesion owing to the shear force generating during the vulcanization can be prevented by setting the value Gb'0 of the storage shear modulus Gb' of the primer layer at a temperature at which the storage shear modulus Ga' of the protective cover reaches the maximum value Ga'max within a temperature range of 150 to 200° C. envisaged as a vulcanization temperature, to a value larger than 1% of the maximum value Ga'max, as shown by the equation (1), to decrease the difference between them.

EXPLANATION OF SYMBOLS

2. IC tag inlet
3. Protective cover
3A. Sticking out portion
4. Antiadhesive layer
6A. IC chip
6B. Antenna
10. Primer layer
11. Adhesive layer
20N. Green tire
30. Mold
Sf. Front surface
Sr. Rear surface
Ts. Inner surface of tire

BEST MODE FOR CARRYING OUT THE INVENTION

An embodiment of the present invention will now be explained with reference to the accompanying drawings.

Figure 1A:
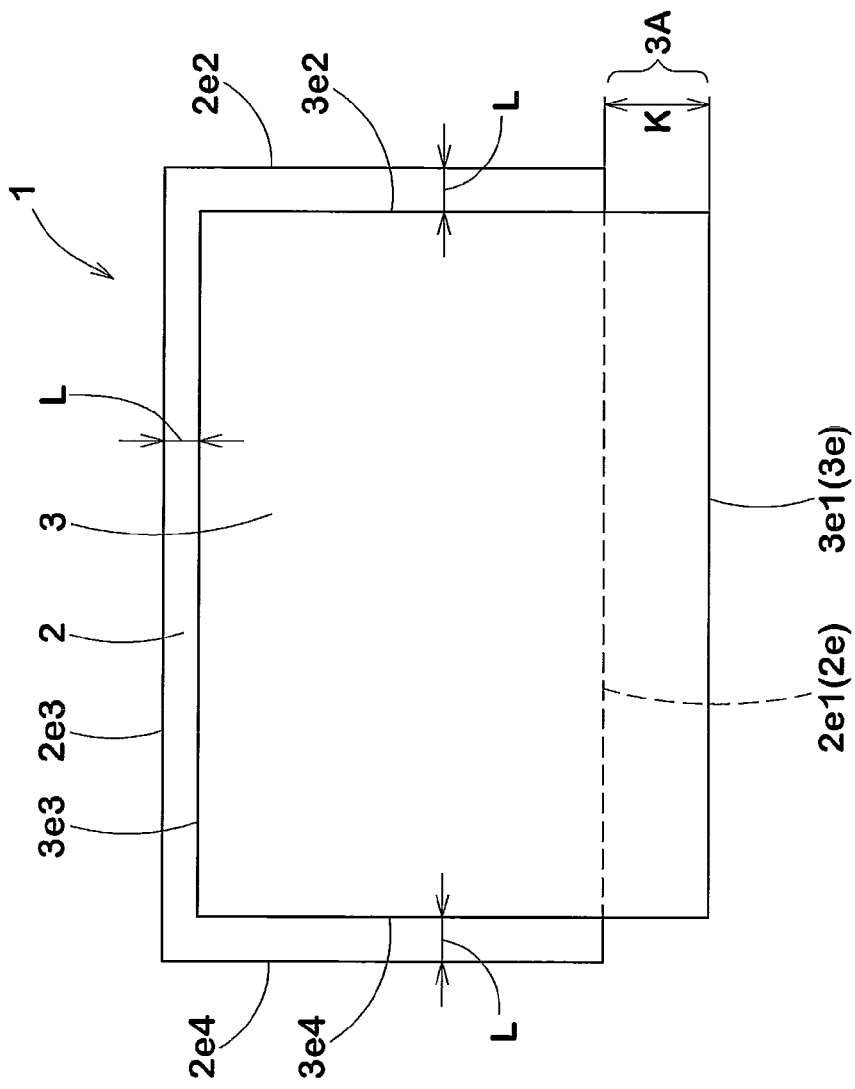
FIGS. 1(A) and 1(B) are a front view and a cross sectional view of an IC tag according to an embodiment of the present invention.
Figure 1B:
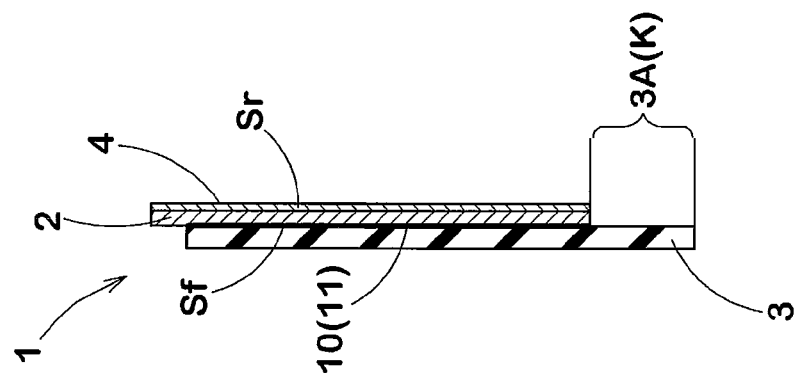

As conceptually shown in FIGS. 1(A) and 1(B), an IC tag 1 of this embodiment includes an IC tag inlet 2 in the form of sheet, a protective cover 3 made of an unvulcanized rubber sheet adhered to a front surface Sf of the IC tag inlet 2, and an antiadhesive layer 4 formed on a rear surface Sr of the IC tag inlet 2.

Figure 2A:
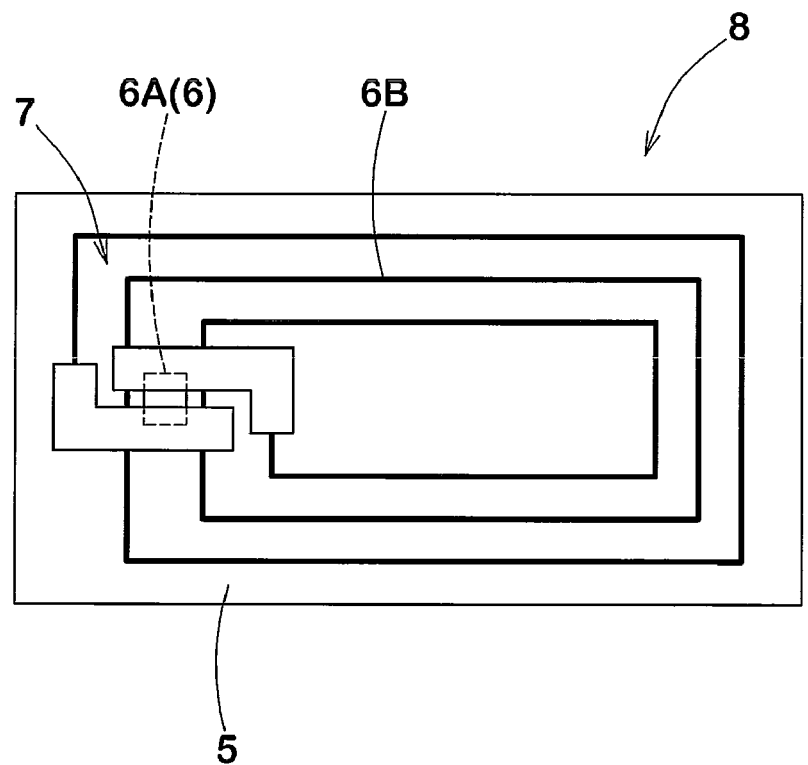
FIGS. 2(A) and 2(B) are a front view and a cross sectional view showing an IC tag inlet of the IC tag.
Figure 2B:
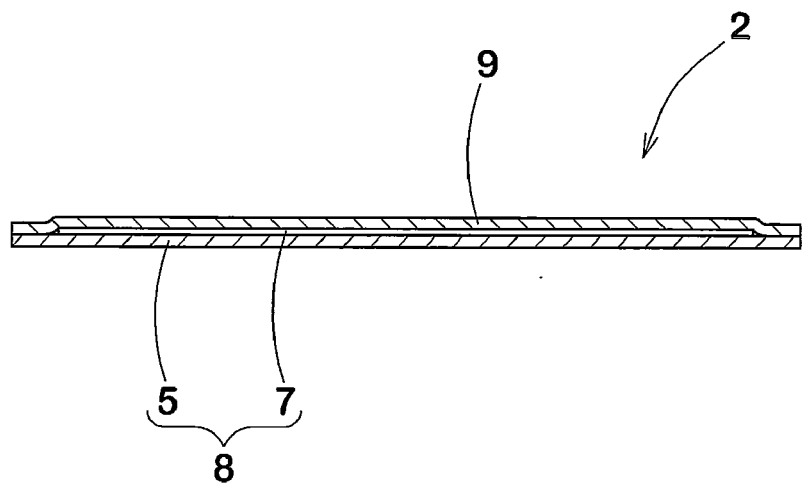

The IC tag inlet 2 is an inlet having IC chip 6A and antenna 6B incorporated therein and capable of communicating by radio. As shown in FIGS. 2(A) and 2(B) as an example of the IC tag inlet 2, it comprises for example a so-called printed circuit board 8 in which electronic components 6 including the IC chip 6A and the antenna 6B are mounted on a film-like insulated substrate 5 to form an electronic circuit 7, and a protective film 9 made of for example polyethylene terephthalate (PET) which is laminated on the printed circuit board 8 to cover and protect the electronic circuit 7. As an IC tag inlet 2 for use in tires is preferably used a thin flexible inlet having a thickness of at most 0.1 mm and capable of undergoing bending deformation. The IC tag 1 shown in this embodiment can be used so that the protective film 9 side is the front surface Sf or the rear surface Sr.

The protective cover 3 comprises a thin unvulcanized rubber sheet having a thickness of, for example, about 0.3 to about 2.0 mm. As shown in FIG. 1(A), the protective cover 3 in this embodiment is in a rectangular form that the periphery is surrounded by four sides, as well as the IC tag inlet 2. As a rubber used in the protective cover 3, various rubbers capable of undergoing vulcanization adhesion with an inner liner constituting an inner surface Ts of a tire can be used alone or in the form of blends thereof, e.g., natural rubber (NR), diene rubbers such as polyisoprene (IR), styrene-butadiene rubber (SBR) and butadiene rubber (BR), butyl-based rubbers such as butyl rubber (IIR) and a halogenated butyl rubber (X-IIR), and the like. It is preferable to incorporate a natural rubber (NR) which has an excellent adhesion property, in an amount of at least 80 parts by weight per 100 parts by weight of a rubber component.

The protective cover 3 has a sticking out portion 3A which runs out from a part of the periphery of the IC tag inlet 2, and it is adhered to the tire inner surface Ts, using the sticking out portion 3A, through vulcanization adhesion. Specifically, in this embodiment, the IC tag inlet 2 is in a rectangular form that the periphery is surrounded by four sides 2e, and the protective cover 3 is in a rectangular form that the periphery is surrounded by four sides 3e. Further, the protective cover 3 has, on a side of one side 3e1 among four sides 3e, a sticking out portion 3A which runs out outwardly from one side 2e1 of the IC tag inlet. The sticking out amount K of the sticking out portion 3A from the side 2e1, namely the distance K between the side 2e1 and the side 3e1, is at most 1.0 mm.

If the thickness of the protective cover 3 is less than 0.3 mm, it is difficult to protect the IC tag inlet 2 from an external force received through a bladder at the time of vulcanization molding. Furthermore, there is a possibility that the tensile strength becomes insufficient and accordingly the protective cover 3 is broken by centrifugal force or the like during running to result in detachment of the IC tag 1 from a tire.

From such points of view, it is more preferable that the protective cover 3 has a thickness of at least 0.5 mm, especially at least 0.8 mm. Further, if the sticking out amount K is less than 1.0 mm, a margin for the vulcanization adhesion with the tire inner surface Ts is too small, so there is a possibility that the adhesion strength is insufficient and the IC tag 1 may be detached from a tire by centrifugal force or the like during running. From such a point of view, it is preferable that the sticking out amount K is at least 3.0 mm, especially at least 5.0 mm.

In case of the above-mentioned protective cover 3, it is also necessary that the remaining three sides $3e2$ to $3e4$ thereof each is located inward of each of the remaining three sides $2e2$ to $2e4$ of the IC tag inlet 2 by a distance L of at least 0.5 mm. The reason is that if the distance L is less than 0.5 mm, there is a possibility that rubber flow may occur in the protective cover 3 at the time of vulcanization molding, so the IC tag 1 may adhere to the tier inner surface Ts at portions other than the sticking out portion 3A and, as a result, the object of the present invention is not achieved. Therefore, it is preferable that the distance L is at least 1.0 mm, especially at least 2.0 mm. As to the upper limit of the distance L, it is preferable from the viewpoints of protective effect by the protective cover 3 and adhesion strength between protective cover 3 and IC tag inlet 2 that the distance L is at most 5.0 mm, especially at most 4.0 mm. Further, if the protective cover 3 is too thick, the rubber flow in vulcanization molding may be enhanced. Therefore, from the viewpoint of preventing the adhesion at portions other than the sticking out portion 3A owing to rubber flow, it is preferable that the thickness of the protective cover 3 is at most 2.0 mm, especially at most 1.5 mm.

Figure 3:
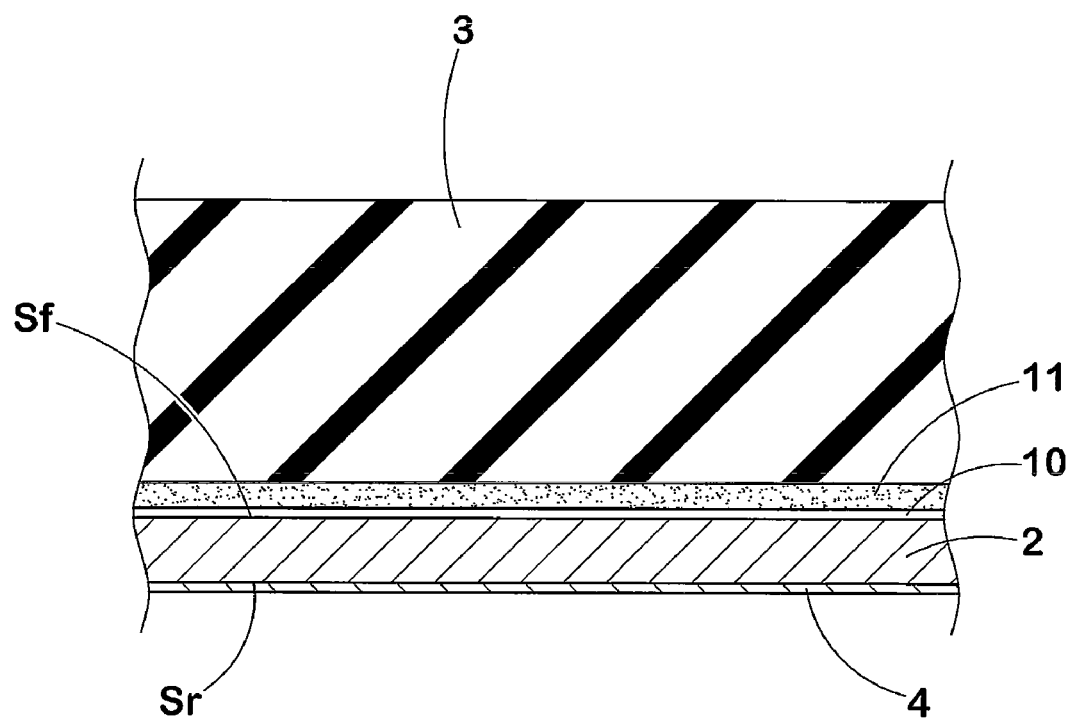
FIG. 3 is a cross sectional view showing a primer layer and an adhesive layer in an enlarged form.

The protective cover 3, the cross section of which is shown in an enlarged form in FIG. 3, is adhered to the surface Sf of the IC tag inlet 2 through a primer layer 10 and an adhesive layer 11.

The primer layer 10 is a layer of a primer or a surface treating agent coated onto the surface Sf of the IC tag inlet 2 in order to enhance the adhesion. As a primer can be used, for example, resin primers such as a polyurethane resin, a polyester resin, an epoxy resin, a urethane-modified polyester resin, a resorcinol-formaldehyde resin and a chlorinated resin, and blends of these resin primers with rubbers such as natural rubber and synthetic rubbers. Examples of commercially available primers are, for instance, Nippolane (made by Nippon Polyurethane Industry Co., Ltd.), Seikabond U-507 (made by Dainichiseika Color & Chemicals Mfg. Co., Ltd.), Epikron H353 (made by Dainippon Ink & Chemicals Inc.), Seikabond E-256-40 (made by Dainichiseika Color & Chemicals Mfg. Co., Ltd.), Vylon UR8700 (made by Toyobo Co., Ltd.), Elitel UE3300 (made by Unitika Ltd.), and the like. As a rubber to be blended with the resin primer are preferred those capable of easily conducting the blending by dissolving in an organic solvent. In case of natural rubber, a natural rubber having a Mooney viscosity of at most 60 and capable of dissolving in an organic solvent is preferable. It is also preferable to add an isocyanate, melamine or a resin such as a blocked isocyanate as a curing agent. The primer layer 10 is not required to form into a thick layer. A thickness of at most 10 μm is sufficient for the primer layer 10, and preferably the thickness is at most 3 μm. As to the upper limit thereof, the thickness is at least 0.1 μm and, if the thickness is less than 0.1 μm, no effect of the primer is exhibited.

An adhesive layer 11 is applied onto the primer layer 10. A heat resistant adhesive such as an acrylic adhesive, a silicone adhesive or a rubber adhesive is preferred for the adhesive layer 11. The thickness of the adhesive layer 11 is not particularly limited, but it is preferable to select from, for example, a range of 5 to 50 μm.

In the present invention, a relationship between a maximum value Ga'max of the storage shear modulus Ga' of a rubber of the protective cover 3 at a temperature range of 150 to 200° C. and a value Gb'0 of the storage shear modulus of the primer layer 10 at a temperature T0 exhibiting the maximum value Ga'max is regulated to satisfy the following equation (1):

$$Ga'\text{max} \times 10^{-2} < Gb'0 \tag{1}$$

in order to prevent deadhesion between the protective cover 3 and the IC tag inlet 2 in vulcanization molding.

In a step of vulcanization molding of tires, a pressurizing and heating medium such as steam, hot water or heated gas is charged into an inner cavity of a tire placed in a mold through a bladder to apply a pressure with heating. At that time, the bladder expands while coming into contact with the tire inner surface Ts, so a strong shear force acts on the tire inner surface Ts. This shear force also acts on the surface of the protective cover 3 off the IC tag 1.

On the other hand, the rubber of the protective cover 3 starts its vulcanization at a temperature of about 150° C., and the value of storage shear modulus Ga' increases with elevation of the temperature. To the contrary, in the primer layer 10, the storage shear modulus Gb' decreases. Therefore, if the difference between the storage shear modulus Ga' and the storage shear modulus Gb' becomes large in the course of the vulcanization, the primer layer 10 cannot endure a high shear force transmitted from the protective layer 3 which will increase its elasticity with progression of vulcanization, so the IC tag inlet 2 becomes easy to cause deadhesion. The storage shear modulus Gc'0 of the adhesive layer 11 at the temperature T0 is not less than the storage shear modulus Gb'0 of the primer layer 10.

Thus, in the present invention, the value Gb'0 of the storage shear modulus Gb' of the primer layer 10 at a temperature at which the storage shear modulus Ga' of the protective cover 3 reaches the maximum value Ga'max within a temperature range of 150 to 200° C. envisaged as a vulcanization temperature is set to a value larger than 1% of the maximum value Ga'max, as shown by the equation (1). In other words, the ratio Gb'0/Ga'max is set to more than 0.01, whereby the difference between them is reduced to prevent the deadhesion owing to the shear force generating during the vulcanization. It is preferable that the ratio Gb'0/Ga'max is at least 0.011, especially at least 0.02. The upper limit thereof is not particularly limited, but from the viewpoint of the flexibility of the primer, the ratio Gb'0/Ga'max is preferably at most 100, more preferably at most 10.

An antiadhesive layer 4 is formed on the rear surface Sr of the IC tag inlet 2, thereby preventing the IC tag inlet 2 from adhering to the tire inner surface Ts during the vulcanization molding of tire. As the antiadhesive layer 4 is preferably used an antiadhesive sheet 15 in which an antiadhesion treatment is applied to the rear surface of a sheet made of a resin material which is not melted at 180° C., e.g., polyethylene terephthalate (PET), polyethylene naphthalate (PEN), polyetherimide (PEI), polyphenylene ether (PPS), polyimide (PI), polyether ether ketone and the like. Such an antiadhesion sheet 15 is adhered to the rear surface Sr of the IC tag inlet 2 through an adhesive to thereby form the antiadhesive layer 4. At that time, the antiadhesive layer 4 is formed on the entire rear surface Sr of the IC tag inlet 2.

As to the antiadhesion treatment, a coating treatment is preferred in which a releasable resin having a releasability to a rubber, such as a polyfluoroethylene resin or a silicone resin, is coated onto the rear surface of the sheet as mentioned above. The antiadhesive sheet 15 can be formed from only the releasable resin. The thickness of the antiadhesive layer 4 is not particularly limited, but it is preferably from 0.1 to 50 μm.

A pneumatic tire 20 including the IC tag 1 fitted to the tire inner surface Ts will be explained below with a method for fitting the IC tag.

Figure 4:
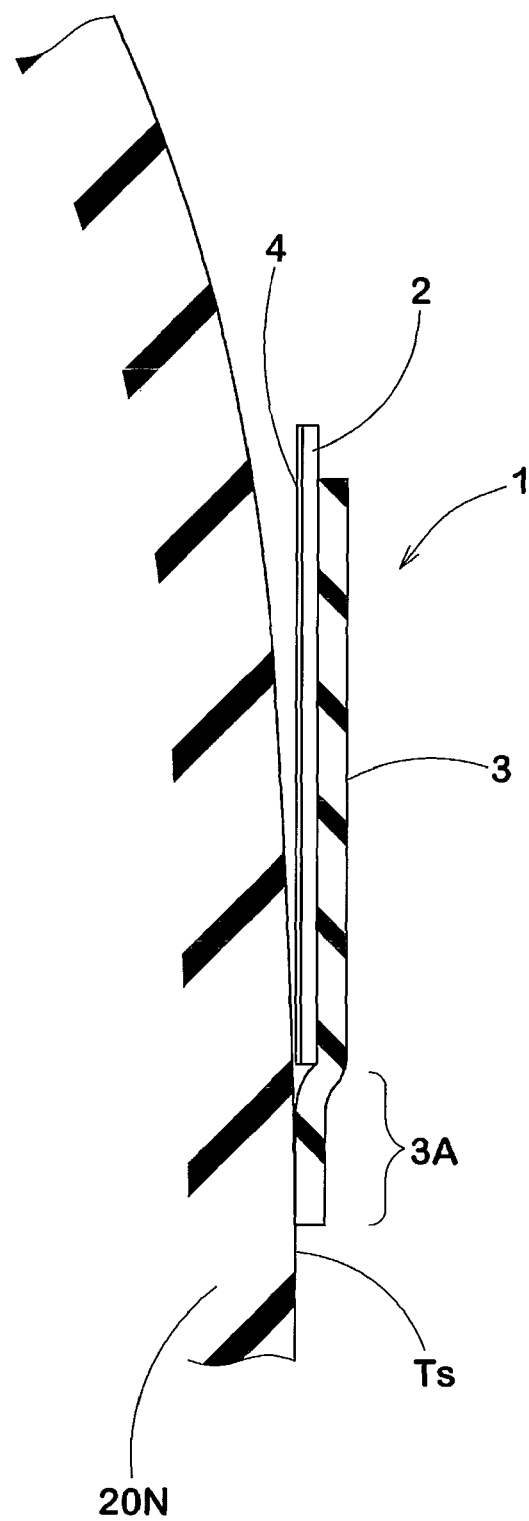
FIG. 4 is a cross sectional view showing a temporary fitting step.

The method for fitting the IC tag 1 includes:

(1) a temporarily fitting step (FIG. 4) of temporarily fitting the IC tag 1 by adhering the sticking out portion 3A of the protective cover 3 to an inner surface Ts of an unvulcanized green tire 20N, and (2) a vulcanization adhesion step (FIG. 5) of subjecting the green tire 20N fitted with the IC tag 1 to vulcanization molding in a mold 30 to thereby perform vulcanization adhesion of only the sticking out portion 3A to the tire inner surface Ts by vulcanization heat and vulcanization pressure of the vulcanization molding.

Figure 5:
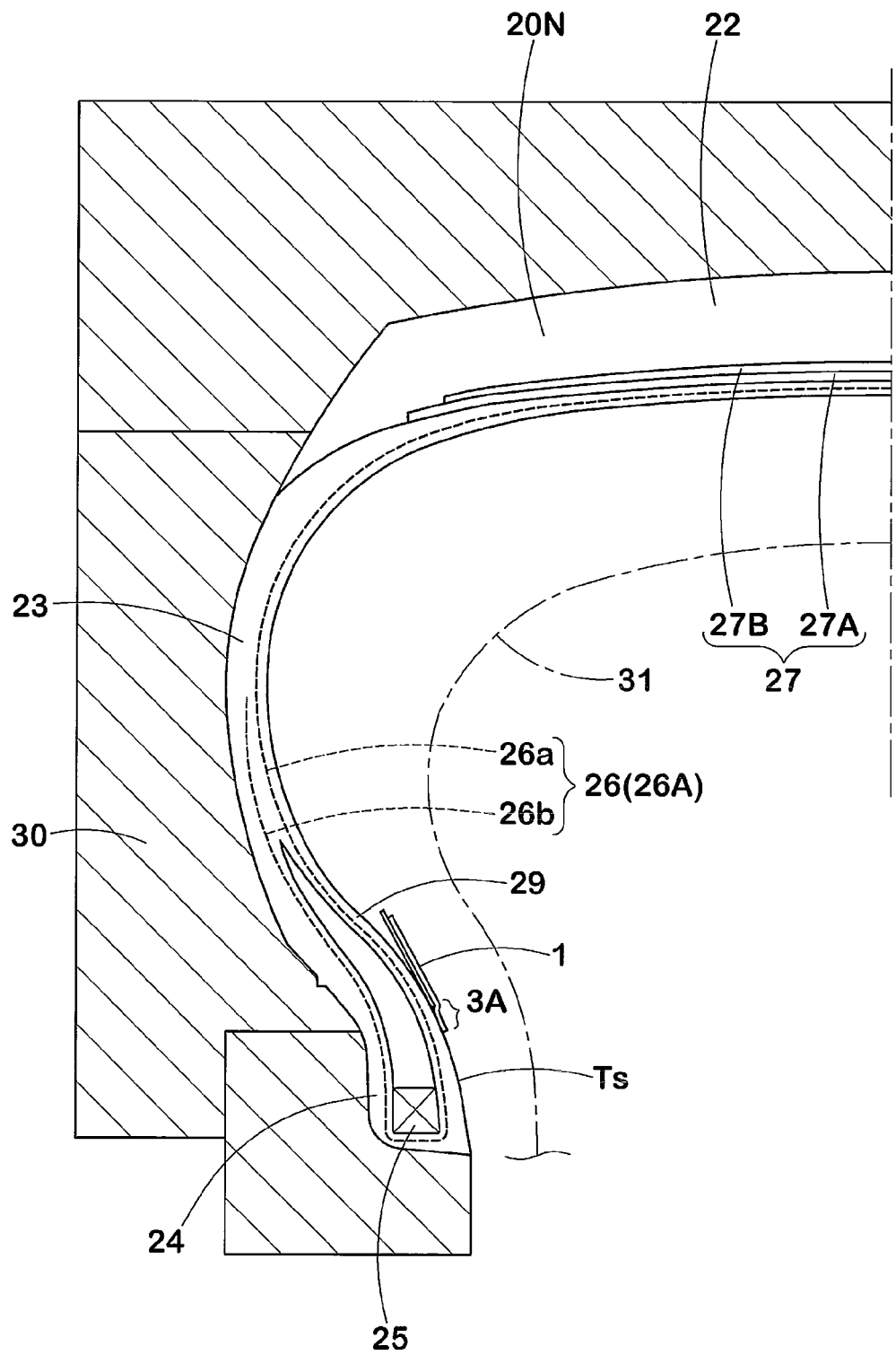
FIG. 5 is a cross sectional view showing a vulcanization adhesion step.
Figure 6:
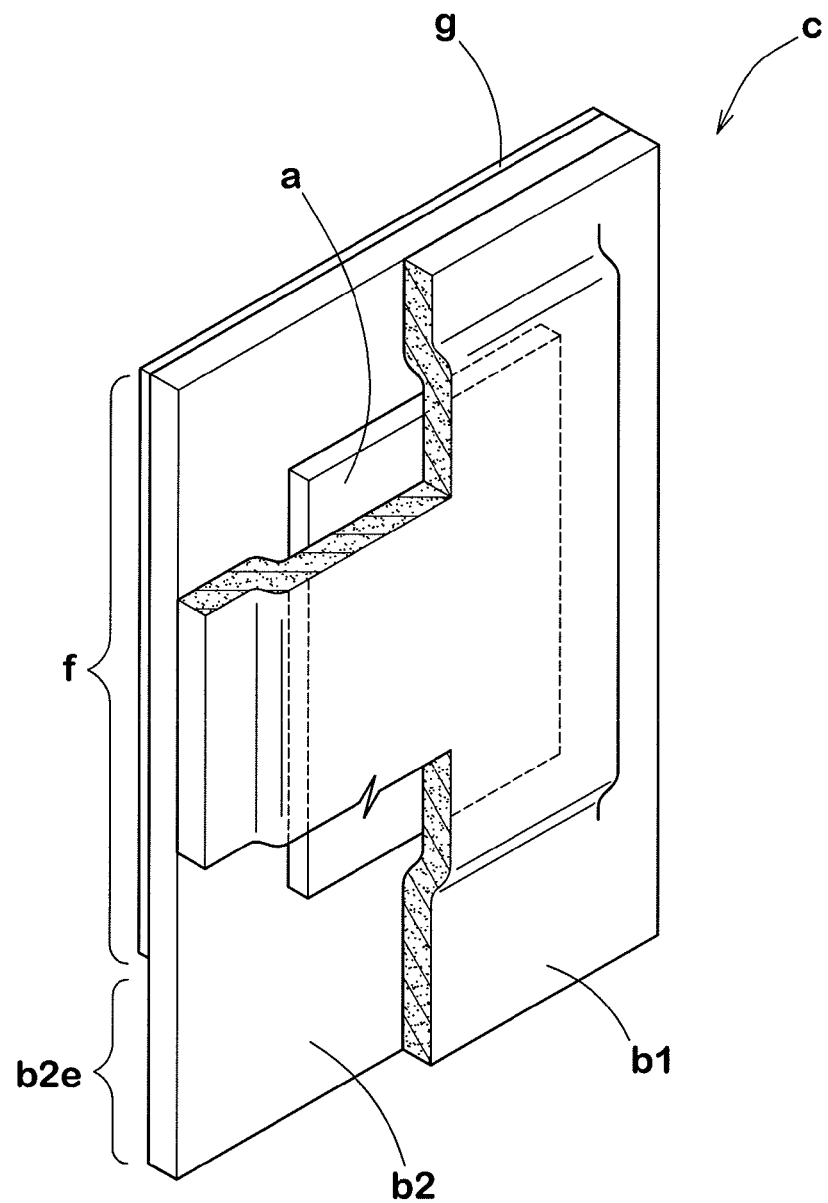
FIG. 6 is a perspective view illustrating prior art.

The green tire 20N includes, as shown in FIG. 5, a carcass 26 extending from a tread portion 22 to bead cores 25 in bead portions 24 through sidewall portions 23 and, in this embodiment, it further includes a belt layer 27 disposed inside the tread portion 22 and radially outward of the carcass 26.

The carcass 26 comprises at least one carcass ply (in this embodiment, one carcass ply 26A) in which carcass cords are arranged at an angle of, for example, 70 to 90° with respect to the tire circumferential direction. The carcass ply 26A is composed of a ply main portion 26a that extends between the bead cores 25, 25, and ply turnup portions 26b that are continuous with the both ends of the ply main portion 26a and are turned up around the bead cores 25. An inner liner 29 which is made of a rubber having an excellent air impermeability (e.g., butyl-based rubber as mentioned above) and which forms the tire inner surface Ts is disposed inward of the ply main portion 26a.

The belt layer 27 comprises at least two belt plies (in this embodiment, two belt plies 27A and 27B) in which belt cords are arranged at an angle of, for example, 10 to 35° with respect to the tire circumferential direction. The belt cords in one ply intersect the cords in the other belt ply, whereby the rigidity of the belt is enhanced to strongly reinforce a full width of the tread portion 22 with a hoop effect. Further, in order to enhance performances in high speed running such as steering stability and durability, a band layer (not shown) in which band cords are arranged at an angle of 5° or less with respect to the circumferential direction, may be disposed radially outward of the belt layer 27.

The IC tag 1 is temporarily fitted to the tire inner surface Ts in the bead portion 24 in such a state that the sticking out portion 3a is located radially inward of the tire. The bead portion 24 is a portion at which the amount of deformation in running is the smallest, and detachment of the IC tag 1 from the tire can be prevented by attaching the IC tag 1 to such a portion of the tire. Further, since the IC tag is fixed to the tire at only the sticking out portion 3A and accordingly an external force in deformation of tire does not act on the IC tag inlet 2, the IC tag inlet can be prevented from being damaged.

The temporary fitting is carried out by utilizing a tackiness of an unvulcanized rubber, but an adhesive can be used as occasion demands.

The above-mentioned vulcanization adhesion step is carried out according to a conventional vulcanization step. That is to say, a pressurizing heating medium is charged into an inner cavity of a green tire 20N temporarily fitted with the IC tag 1 and placed in a mold 30 through a bladder 31. The bladder 31 presses the whole of the IC tag 1 against the tire inner surface Ts by expansion thereof. Thus, only the sticking out portion 3A at which no antiadhesive layer is present undergoes vulcanization adhesion to the tire inner surface Ts.

A particularly preferable embodiment of the present invention has been described, but the present invention can be practiced with various changes and modifications without being limited to such an embodiment shown in the drawings.

EXAMPLES

An antiadhesive sheet 15 was adhered to a rear surface Sr of an IC tag inlet 2 having a thickness of 100 μm to form an adhesive layer 4. Further, a primer and an adhesive were coated in that order to a front surface Sf of the IC tag inlet 2 to form a primer layer 10 and an adhesive layer 11. A protective cover 3 made of an unvulcanized rubber sheet was then stuck to the adhesive layer 11 to give an IC tag 1 having a structure shown in FIG. 1.

As the antiadhesive sheet 15 was used a PET sheet coated with a releasable resin on one surface thereof and having a thickness of 50 μm. A natural rubber-based adhesive was used as the adhesive mentioned above, and the adhesive layer 11 having a thickness of 35 μm was formed therefrom. As the primer were used those shown in Table 1, and the primer layer 10 having a thickness of 31$m$ was formed therefrom. As the protective cover 3 was used an unvulcanized rubber sheet made of natural rubber as a rubber component and having a thickness of 0.6 mm. The sticking out amount (distance K) of the sticking out portion 3A of the protective cover 3 was 5.0 mm, and the exposing amount (distance L) of each of three sides 2e2 to 2e4 of the IC tag inlet 2 from each of the remaining three sides 3e2 to 3e4 of the protective cover 3 was 2.0 mm.

The IC tag 1 was fitted to an inner surface of a pneumatic tire (size 195/65R15) by vulcanization adhesion according to the IC tag fitting method of the present invention, and the pneumatic tire fitted with the IC tag 1 was subjected to a running test to observe detachment of the IC tag 1 from the tire and separation of the IC tag inlet 2 from the protective cover 3.

The running test was carried out by mounting the tire on a rim (15×6JJ) and running it 5,000 km on a drum at a speed of 80 km/hour under conditions of inner pressure 190 KPa and load 6.96 kN. The tire was then removed from the rim and the fitting state of the IC tag was visually observed

TABLE 1

| | Composition of primer | | Maximum storage shear modulus Ga'max of protective cover (Pa) (at 170° C.) | Storage shear modulus Gb'0 of primer (Pa) (at 170° C.) | Ratio Gb'0/Ga'max | Detachment |
|---|---|---|---|---|---|---|
| Ex. 1 | Nippolane 3230 | 100 parts by wt. | $1.18 \times 10^5$ | $3.58 \times 10^4$ | 0.303 | No |
| | Coronate L | 5 parts by wt. | | | | |
| Ex. 2 | Seikabond U0507 | 100 parts by wt. | $1.18 \times 10^5$ | $4.61 \times 10^5$ | 3.9 | No |
| | Seikabond UD-C | 6 parts by wt. | | | | |

TABLE 1-continued

| | Composition of primer | | Maximum storage shear modulus Ga'max of protective cover (Pa) (at 170° C.) | Storage shear modulus Gb'0 of primer (Pa) (at 170° C.) | Ratio Gb'0/Ga'max | Detachment |
|---|---|---|---|---|---|---|
| Ex. 3 | Epikron H353 Coronate L | 100 parts by wt. 5 parts by wt. | $1.18 \times 10^5$ | $1.86 \times 10^5$ | 15.7 | No |
| Ex. 4 | Seikabond E-256-40 Seikabond UD-C | 100 parts by wt. 3.2 parts by wt. | $5.92 \times 10^4$ | $1.19 \times 10^5$ | 2 | No |
| Ex. 5 | Natural rubber Elitel UE3300 Coronate L | 100 parts by wt. 100 parts by wt. 10 parts by wt. | $5.92 \times 10^4$ | $4.47 \times 10^5$ | 7.55 | No |
| Ex. 6 | Vylon UR8700 Sumijule L-75 | 100 parts by wt. 5 parts by wt. | $5.92 \times 10^4$ | $4.47 \times 10^5$ | 7.55 | No |
| Com. Ex. 1 | Natural rubber Elitel UE3300 | 100 parts by wt. 100 parts by wt. | $1.18 \times 10^5$ | $9.74 \times 10^2$ | 0.0083 | Yes |
| Com. Ex. 2 | Vylon UR8700 Sumijule L-75 | 100 parts by wt. 0.5 part by wt. | $5.92 \times 10^4$ | $4.87 \times 10^2$ | 0.0082 | Yes |

Notes in Table 1
(a) Nippolane 3230 (Nippon Polyurethane Industry Co., Ltd.)
(b) Coronate L (Nippon Polyurethane Industry Co., Ltd.)
(c) Seikabond U-507 (Dainichiseika Color & Chemicals Mfg. Co., Ltd.)
(d) Seikabond UD-C (Dainichiseika Color & Chemicals Mfg. Co., Ltd.)
(e) Epikron H353 (Dainippon Ink & Chemicals Inc.)
(f) Seikabond E-256-40 (Dainichiseika Color & Chemicals Mfg. Co., Ltd.)
(g) Elitel UE3300 (Unitika Ltd.)
(h) Vylon UR8700 (Toyobo Co., Ltd.)
(i) Sumijule L-75 (Sumika Bayer Urethane Co., Ltd.)

The IC tags of Examples 1 to 6 showed, after the vulcanization molding, that the protective cover 3 and the IC tag inlet 2 adhered to each other, and showed, even after the running test, that there was no occurrence of detachment of the IC tag inlet from the protective cover 3. In contrast, the IC tags of Comparative Examples 1 and 2 caused partial separation between the protective cover 3 and the IC tag inlet 2 during the vulcanization molding, and caused separation of the IC tag inlet 2 during the running test.

What is claimed is:

1. An IC tag including a sheet-like IC tag inlet mounted with an IC chip and an antenna, a protective cover which is made of an unvulcanized rubber sheet adhered to the front surface of said IC tag inlet through a primer layer and an adhesive layer and which has a sticking out portion which runs out from a part of the periphery of said IC tag inlet, and an antiadhesive layer formed on the rear surface of said IC tag inlet for preventing vulcanization adhesion between the rear surface and a rubber, wherein said primer layer satisfies the following equation (1):

$$Ga'\text{max} \times 10^{-2} < Gb'0 \qquad (1)$$

wherein Ga'max is a maximum value of storage shear modulus Ga' of a rubber of said protective cover within the temperature range of 150 to 200° C., and Gb'0 is a storage shear modulus of said primer layer at a temperature T0 showing said maximum value Ga'max.

2. The IC tag of claim 1, wherein said IC tag inlet and said protective cover are in a rectangular form that the periphery is surrounded by four sides, said protective cover has, on a side of one of the four sides, said sticking out portion which runs out from one side of said IC tag inlet by a distance K of at least 1.0 mm, and each of the remaining three sides of said protective cover is located inside of each of the remaining three sides of said IC tag inlet by a distance L of at least 0.5 mm.

3. The IC tag of claim 1, wherein said IC tag inlet and said protective cover are in a rectangular form that the periphery is surrounded by four sides, and said protective cover has, on only a side of one of the four sides, said sticking out portion which runs out from one side of said IC tag inlet.

4. A pneumatic tire having the IC tag of claim 1 or 2 fitted to an inner surface of the pneumatic tire, in which said sticking out portion of said protective cover is adhered to the tire inner surface.

5. A method for fitting the IC tag of claim 1 or 2 to an inner surface of a pneumatic tire, in which said sticking out portion of said protective cover is adhered by tacky adhesion to an inner surface of an unvulcanized green tire to temporarily attach said IC tag, and said green tire is subjected to vulcanization molding in a mold to perform vulcanization adhesion of only said sticking out portion to the tire inner surface by vulcanization heat and vulcanization pressure.

* * * * *